United States Patent [19]

Fukaya et al.

[11] Patent Number: 4,763,828
[45] Date of Patent: Aug. 16, 1988

[54] METHOD FOR BONDING CERAMICS AND METALS

[75] Inventors: Yasuhiro Fukaya; Shozo Hirai, both of Nishi, Japan

[73] Assignee: Mitsubishi Jukogyo Kabushiki Kaisha

[21] Appl. No.: 935,067

[22] Filed: Nov. 21, 1986

Related U.S. Application Data

[63] Continuation of Ser. No. 681,022, Dec. 13, 1984, abandoned.

[30] Foreign Application Priority Data

Dec. 20, 1983 [JP] Japan ............... 58-238818

[51] Int. Cl.$^4$ .................. B23K 1/04; B23K 1/20; B23K 20/16
[52] U.S. Cl. .................. 228/124; 228/189; 228/193
[58] Field of Search ........... 228/198, 122, 123, 193, 228/194, 124, 263.12, 189

[56] References Cited

U.S. PATENT DOCUMENTS

| | | | |
|---|---|---|---|
| 3,110,571 | 11/1963 | Alexander | 228/263.12 |
| 3,324,543 | 6/1967 | McVey | 228/122 |
| 3,448,319 | 6/1969 | Louden | 228/122 |
| 3,994,430 | 11/1976 | Cusano | 228/122 |
| 4,109,031 | 8/1978 | Marscher | 228/122 |
| 4,324,356 | 4/1982 | Blair | 228/193 |
| 4,505,418 | 3/1985 | Neidig | 228/198 |

FOREIGN PATENT DOCUMENTS 737144  6/1980  U.S.S.R. ............... 228/124

Primary Examiner—Kenneth J. Ramsey
Attorney, Agent, or Firm—Toren, McGeady & Associates

[57] ABSTRACT

A method for bonding oxide ceramics and metals which comprises the steps of depositing, on an oxide ceramic material, a composite insert material consisting of a mixture of at least one oxide selected from the group consisting of $Cu_2O$, NiO, $SiO_2$, FeO, AgO, $Al_2O_3$, MoO, $TiO_2$, ZnO, AuO, $Cr_2O_3$, CoO, $ZrO_2$, TaO, $WO_2$, NbO, MgO, CaO and $Y_2O_3$, and at least one metal selected from the group consisting of Cu, Ni, Si, Fe, Ag, Al, Mo, Ti, Zn, Au, Cr, Co, Zr, Ta, W, Nb and Mg by ion plating or spray coating, subjecting the deposited insert material to thermal reaction-promoting treatment to permit metallurgical bond between the composite insert material and the ceramic material, and bonding a metal member to the surface of the insert material by diffusion welding or brazing.

4 Claims, 1 Drawing Sheet

METHOD FOR BONDING CERAMICS AND METALS

This is a continuation of application Ser. No. 681,022, filed Dec. 13, 1984 and now abandoned.

BACKGROUND OF THE INVENTION

1. Field of the Invention

This invention relates to the art of bonding between ceramics and metals.

2. Description of the Prior Art

Broadly, known methods of bonding ceramics and metals together include (1) an adhesive method, (2) a metallizing method and (3) a spray coating method. However, these methods have the following drawbacks.

(1) The adhesive method is the simplest method but adhesion strength at high temperatures is low.

(2) The metallizing method is a method which comprises placing a powder of metal, such as, Mo, Mo—Mn or the like, on ceramics, heating the powder in a moistening atmosphere so as to metallize it on the ceramic, and after effecting Ni-plating on said metal, bonding the surface of said Ni-plating and said metal by soldering.

However, the drawback of this method is that, depending on the kind of ceramics used, it is difficult to carry out. Also, because a high heating temperature is required, considerable thermal stress is exerted on the ceramic upon cooling, thus causing an additional drawback by the ceramic's tendency to crack.

(3) The spray coating method is a method in which ceramic powder is fused and adhered to metals by spraying. The method is also disadvantageous in that the resulting bonding strength is low and the sprayed ceramic becomes porous.

As will be seen from the above, the prior art methods have such drawbacks that the bonding strength is not adequate, ceramics are liable to crack, and limitation is placed on the type of ceramic being applied.

SUMMARY OF THE INVENTION

The present invention overcomes the above drawbacks.

According to the invention, there is provided a method for bonding oxide ceramics and metals which comprises the steps of closely fixing a composite material to an oxide ceramic material consisting of a mixture of at least one oxide selected from the group consisting of $Cu_2O$, $NiO$, $SiO_2$, $FeO$, $AgO$, $Al_2O_3$, $MoO$, $TiO_2$, $ZnO$, $AuO$, $Cr_2O_3$, $CoO$, $ZrO_2$, $TaO$, $WO_2$, $NbO$, $MgO$, $CaO$ and $Y_2O_3$, and at least one metal selected from the group consisting of Cu, Ni, Si, Fe, Ag, Al, Mo, Ti, Zn, Au, Cr, Co, Zr, Ta, W, Nb and Mg by ion plating or spray coating, subjecting the deposited insert material to thermal reaction-promoting treatment to permit metallurgical bond between the composite insert material and the ceramic material, and bonding a metal member to the surface of the insert material by diffusion welding or brazing.

According to the method of the invention, when the composite insert material is deposited on the ceramic according to ion-plating or spray coating techniques and subjected to thermal reaction-promoting treatment or processing including a hot hydrostatic pressure treatment (hereinafter referred to simply as HIP), joints of a complicated form can be readily bonded together with good bonding strength without creating any cracks in the ceramic. Thus, the method enables one to bond between ceramics and metals.

The present invention can be applied to the manufacture of paper-making machines, injection molding machines and other various machines.

Objects, advantages and features of the invention will become apparent from the following description with reference to the accompanying drawing.

DETAILED DESCRIPTION OF THE INVENTION

Figure 1A:
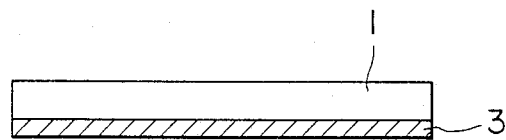
FIGS. 1(A) through 1(D) are a schematic view illustrating the steps of a method embodying the present invention.

Reference is now made to the drawing in which reference numeral 1 indicates an oxide ceramic such as $Al_2O_3$, $ZrO_2$ or the like and reference numeral 2 indicates a metal being bonded to the ceramic. Reference numeral 3 designates a composite insert material made of oxides and metals and reference numeral 4 indicates a brazing material whose melting point is lower than the melting point of the insert material 3. The insert material is made of at least one oxide selected from $Cu_2O$, $NiO$, $SiO_2$, $FeO$, $AgO$, $Al_2O_3$, $MoO$, $TiO_2$, $ZnO$, $AuO$, $Cr_2O_3$, $CoO$, $ZrO_2$, $TaO$, $WO_2$, $NbO$, $MgO$, $CaO$ and $Y_2O_3$, and at least one metal selected from Cu, Ni, Si, Fe, Ag, Al, Mo, Ti, Zn, Au, Cr, Co, Zr, Ta, W, Nb and Mg. The at least one metal should contain not less than 5 wt% in the insert material. The brazing material is, for example, solder, Al, Ag, Cu, Ni and the like solders.

Figure 1B:
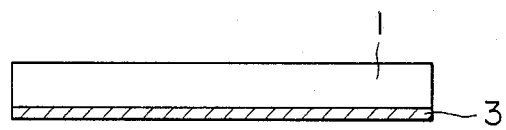
Figure 1C:
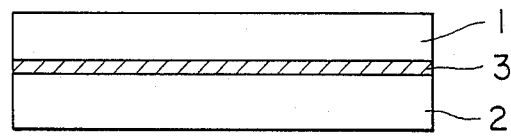
Figure 1D:
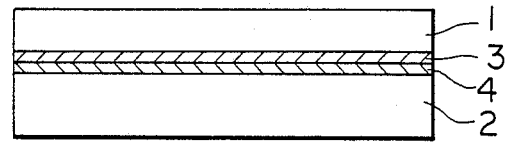

In FIG. 1(A), the composite insert material 3 is fixedly deposited on the ceramic 1 by ion-plating or spray coating (step A). Subsequently, the resulting subassembly is subjected to thermal reaction-promoting processing in FIG. 1(B) (step B), followed by diffusion welding with the bonding metal 2 (step C) or brazing, as 4, as in FIG. 1(D) (step D).

The ion plating of step A is carried out as follows.

(1) In a complex insert of an oxide and metal, if the structural metal of the oxide is the same as that of the complex insert, e.g., $Cu_2O+Cu$, $Al_2O_3+Al$, $SiO_2+Si$, $Mg+Mg$, $CaO+Ca$, $Y_2O_3+Y$ and the like, the following two methods are feasible.

First Method:

Metals which are constituents of the composite insert material, e.g. Cu, Al, Si, Mg, Ca, Y and the like, are placed in a crucible and melted and evaporated and ionized to effect ion plating. In this connection, it should be noted that the atmosphere for the ion plating is alternately changed between vacuum and an oxygen atmosphere. As a principle, an initial layer is formd in an oxygen atmosphere and a final layer is in a vacuum. More particularly, a metal layer is formed in the vacuum and a metal oxide layer is formed in the oxygen atmosphere, by which a composite insert material of a composite structure comprising oxide and metal layers, e.g. $Cu_2O+Cu$, $Al_2O_3+Al$ or the like, is fixedly deposited on the ceramic.

Second Method:

Metal constituents for an intended composite insert material, e.g. Cu, Al, Si, Mg, Ca, Y or the like, are placed in a crucible and melted and evaporated and ionized. In this connection, the ion platinag is effected by a procedure which comprises, after evacuation, feeding a predetermined amount of oxygen into a chamber in order to oxidize part of the metal heated and evaporated. As a result, a composite insert material having a predetermined ratio of the oxide and metal ($Cu_2O+Cu$, $Al_2O_3+Al$ or the like combination) is deposited on the ceramic.

(2) If an oxide is not an oxide of a metal which is one of constituents of an intended composite insert material, the following method is used.

Two crucible are provided in order that a metal (e.g. Cu, Al or the like) which should be converted into a corresponding oxide is placed in one crucible and a metal which should remain unchanged as a metal constituent for an intended composite insert material is placed in the other crucible. The respective metals are melted and evaporated for ion plating. In this connection, the ion-plating atmosphere should be alternately changed between oxygen and vacuum. As a principle, an initial layer is formed in an oxygen atmosphere and a final layer is formed in a vacuum. For example, when a metal constituent for the composite insert material (e.g. Ni, Cu or the like) is fused and evaporated in a vacuum and a metal (e.g. Ni, Cu or the like) is evaporated in an oxygen atmosphere and converted into a corresponding oxide, the former metal is ion-plated as it is (e.g. Cu, Al or the like) and the latter metal is ion-plated as an oxide (e.g. $Cu_2O$, $Al_2O_3$ or the like). As a result, a composite insert material having a laminate structure of the oxide+metal (e.g. $Cu_2O+Ni$, $Al_2O_3+Ni$, $Al_2O_3+Cu$ or the like) is deposited on the ceramic.

On the other hand, with spray coating, plasma spray coating techniques are used. In such techniques, a mixed powder of oxide and metal powders is spray-coated in a non-oxidative atmosphere to deposit a composite insert material 3 of oxide+metal on the ceramic.

The thermal reaction-promoting processing step B is effected in order to increase the bonding strength between the ion-plated or spray-coated composite insert material 3 and the ceramic 1. In this step, the insert-bearing ceramic is heated in an inert gas or in vacuo at a time over 5 minutes at temperatures of from one third of the melting point of the composite insert material to the melting point of the composite insert material. It will be noted that the melting point of the composite insert material means the lowest temperature among melting points of an oxide, metal and eutectic mixture thereof which constitute the insert material. Alternatively, the HIP treatment may be carried out under conditions of such temperature and time as indicated above where a gas such as Ar is loaded under pressure.

The reason why the temperature used is above 33.3% of the melting point of the insert material is due to the fact that at lower temperatures, the bonding reaction between the composite insert material and the ceramic proceeds only very slowly with a need of a long operation time, thus being unfavorable from the industrial point of view. On the other hand, the upper limit of the temperature is determined to be lower than the melting point of the composite insert material because higher temperatures result in melting and flowing-out of the insert material. The reason why the treating time is over 5 minutes is owing to the fact that when the time is less than 5 minutes, bonding between the composite insert material and the ceramic becomes insufficient.

In the diffusion welding in step C, the composite insert material 3 and the metal 2 being bonded are facing each other and bonded together in vacuo or in an inert gas atmosphere under heating and pressing conditions. The bonding temperature should be below a melting point of whichever the composite insert material or the metal whose melting point is lower. The lower limit of the temperature should be over a recrystallization temperature of whichever the metal component in the composite insert material or the metal being bonded whose melting point is lower. The bonding pressure used should preferably be 5 kg/mm$^2$ and the bonding time should preferably be within 5 hours. The reason why the upper limit of the pressure is 5 kg/mm$^2$ is as follows: a load of higher pressures is apt to cause biased pressure because of the one-dimensional pressing operation, leading to the tendency toward cracking of the brittle ceramic. The bonding time is within 5 hours, within which the bonding is ordinarily accomplished, so that longer times are not advantageous from the industrial standpoint including economy.

With regard to the brazing material 4 used in step D, a brazing material whose melting point is lower than the insert material 3 is used to solder the insert material and the metal 2 therewith. The reason why brazing materials of low melting point are used is that thermal stress produced during the soldering operation due to the difference in thermal expansion coefficient between the ceramic 1 and the metal 2 is reduced so as to prevent cracking of the ceramic.

As described above, the content of the metal component in the composite insert material is defined to be not less than 5 wt%. This is because when the content is less, the ability of bonding with the metal lowers and the ductility of the insert material itself is lost, so that the insert material is liable to crack. On the other hand, when the content of an oxide is less than 1 wt%, the ability of bonding with ceramics deteriorates, so that the upper limit of metals is 99 wt%.

When there is a large difference in thermal expansion coefficient between the ceramic 1 and the bonding metal 2, an alloy Fe—Ni and Fe—Ni—Co approximate to the thermal expansion coefficient of ceramic is previously bonded to the bonding metal 2 by diffusion-welding or explosive deposition. Then, when bonding the ceramic 1 and the metal 2, it is rendered also possible to reduce thermal stress occurring on the ceramic 1, thereby preventing the occurrence of cracking.

Incidentally, in case said bonding metal 2 is steel or stainless steel, when soldering Cu in step D, there is fear that cracking may occur in said bonding metal 2, Fe—Ni alloy and Fe—Ni—Co alloy. In such a case, it is possible to coat said bonding metal 2 with Ni by Ni-plating, diffusion-welding or explosive deposition, thereby reducing thermal stress occurring on the ceramic 1.

The effects, advantages and features of the method of the invention are described below.

(1) Because of the difference in structure between oxide creamics such as $Al_2O_3$, $ZrO_2$ and the like and metals, i.e. the oxide ceramics are chiefly based on ion bonds and metals are based on metallic bonds, the bonding between them is very difficult. Another problem is that because of the poor toughness of the oxide ceramics such as $Al_2O_3$, $ZrO_2$ or the like, these ceramics tend to crack due to the thermal stress produced during the bonding.

In the practice of the invention, so-called cermets of oxides+metals are used as the insert material, so that the oxide component in the composite insert material shows good metallurgical affinity for oxide ceramics such as $Al_2O_3$, $ZrO_2$ and the like, ensuring good bonding between the metal component and the bonding metal.

More specifically, the oxide in the insert material is an oxide similar to ceramics, causing an oxide reaction to ensure strong bonding. For instance, when the ceramic used is $Al_2O_3$ and the oxide in the insert material is $Cu_2O$, a reaction of formation of $CuAlO_2$ takes place as follows $$Cu_2O + Al_2O_3 \rightarrow 2CuAlO_2$$

The metal component in the insert material is the same as the bonding metal, so that good bonding by diffusion welding or brazing is fundamentally ensured.

On the other hand, the composite insert material of oxide+metal is in the form of a cermet and has, in most cases, a thermal expansion coefficient which is smaller than a thermal expansion coefficient of the metal constituent in the composite insert material. Thus, the thermal expansion coefficient of the insert material approaches a thermal expansion coefficient of $Al_2O_3$, $ZrO_2$ or the like. Only for reference, thermal expansion coefficients of typical oxides and metals are shown below.

| | |
|---|---|
| $Al_2O_3$ | $7 \times 10^{-6}/°C.$ |
| $ZrO_2$ | $8 \times 10^{-6}/°C.$ |
| Cu | $17 \times 10^{-6}/°C.$ |
| Ni | $13 \times 10^{-6}/°C.$ |
| Si | $5 \times 10^{-6}/°C.$ |
| Fe | $12 \times 10^{-6}/°C.$ |
| Ag | $20 \times 10^{-6}/°C.$ |
| Al | $24 \times 10^{-6}/°C.$ |
| Mo | $6 \times 10^{-6}/°C.$ |
| Ti | $9 \times 10^{-6}/°C.$ |

From the above coefficients, it will be seen that when the difference in thermal expansion coefficient between oxide ceramics and insert materials is great, large thermal stress is produced during the cooling procedure after the ion-plating or spraying coating on the oxide ceramic and the thermal reaction-promoting treatment, with a very high possibility of occurrence of cracks in the oxide ceramic. However, the composite insert material according to the invention becomes lower in thermal expansion coefficient than insert materials made of single metal constituents, giving a great effect of preventing the oxide ceramics such as $Al_2O_3$, $ZrO_2$ and the like from cracking.

The insert materials are, as mentioned before, cermets of high strength oxides such as $Cu_2O$, which are a kind of ceramic, and metals and have thus high strength, resulting in an increase of joint strength.

(2) In accordance with the present invention, the composite insert material is first deposited on ceramics by ion plating or spray coating. The ion plating or spray coating is very advantageous in that such a technique allows the insert material to be simply deposited on ceramics even when the shape of the ceramic is very complicated. This is very difficult when foils are used.

(3) In the practice of the invention, the thermal reaction-promoting procedure (heat treatment or HIP treatment described before) is followed with the ensuing effects and advantages.

1. As described in (1), when the oxide ceramics such as $Al_2O_3$, $ZrO_2$ and the like and the oxide such as, for example, $Cu_2O$ in the insert material are heated at high temperatures, the oxide reaction is caused to proceed acceleratedly and thus metallurgical bonding is accomplished.

With the HIP treatment, fine voids of the insert material at the interface with the ceramic (i.e. fine voids formed at the time of the ion plating or spray coating) disappear by creep and plastic deformations caused by application of the pressure load, enhancing the bonding force.

2. No matter how the shape of ceramics is complicated, the HIP treatment is possible and thus the insert material can be metallurgically bonded to the oxide ceramics.

The HIP treatment is advantageous in that because a pressure of a hot gas is uniformly, three-dimensionally applied, the operation is possible even when the shape of the ceramic is very complicated, ensuring good bonding between the insert material and the ceramic. The pressure is applied three-dimensionally with a further advantage that there is little fear of producing cracks of the ceramic.

(4) The sub-assembly of the insert material and the bonded metal which has undergone the thermal reaction-promoting treatment is subjected to diffusion welding (step C) or brazing (step D) to complete the bonding. These steps have the following effects.

1. Since the constituent in the insert material and the bonding material are metals, the welding is very easy, so that good joints can be formed using diffusion welding or brazing.
2. In general, the ceramic 1 and the bonding metal 2 have a substantial difference in thermal expansion coefficient, so that the ceramic is apt to crack by the thermal stress produced during the cooling operation after bonding.

In the practice of the invention, when the ceramic 1 and the bonding metal 2 which have a great difference in thermal expansion coefficient are used, the bonding metal 2 has been previously bonded on the surface thereof with Fe—Ni alloy, Fe—Ni—Co alloy or Fe—Cr alloy which has a thermal expansion coefficient close to the coefficient of the ceramic 1. This will reduce the thermal stress produced in the ceramic 1 and is thus very effective in preventing occurrence of the cracks.

As described before, the method of the invention makes use of composite insert materials of oxides+metals, The insert material is deposited by ion plating or spray coating on an oxide ceramic on the surface to which a metal is bonded and the deposited material is strongly adhered by the thermal reaction-promoting treatment. Finally, the insert material and the bonding metal is completely bonded together by diffusion welding or brazing. According to the method of the invention, not only flat lap joint welding between ceramics and metals, but also sleeve joint welding, ceramic welding on inner and outer surface of a metal cylinder and the like complicate weldings are possible. The resulting joints have advantages of high bonding strength and no occurrence of cracks in the ceramics.

The present invention is more particularly described by way of examples.

EXAMPLE 1

$Al_2O_3$ in the form of a 2 mm thick sheet was ion-plated on the surface thereof with a 25 μm thick layer of $Cu_2O+Cu$ (50% $Cu_2O$ and 50% Cu on the weight basis) and thermally treated in vacuo at a temperature of 1000° C. for 1 hour.

Subsequently, a 3 mm thick SS 41 sheet which was used as a bonding metal was placed on the $Cu_2O+Cu$ layer and subjected to diffusion welding in vacuo under conditions of a temperature of 900° C., a pressure of 0.5 kg/mm² and a bonding time of 1 hour.

As a result, a good joint was obtained without involving any cracks in the Al₂O₃ and the joint was free of non-bonded portions over the entire bonded surface.

EXAMPLE 2

ZrO₂ in the form of a 2 mm thick sheet was provided, on which Cu₂O+Ni (60% Cu₂O, 40% Ni on the weight basis) were subjected to plasma spray coating in a thickness of 100 μm and thermally treated in an atmosphere of Ar under conditions of a temperature of 1100° C. and a treating time of 30 minutes.

Thereafter, a 5 mm thick 13 Cr steel plate which was a bonding metal was placed on the Cu₂O+Ni layer and subjected to diffusion welding in vacuo under conditions of a temperature of 900° C., a pressure of 1.0 kg/mm² and a bonding time of 1 hour.

As a result, there was obtained a good joint involving no cracks in the ZrO₂ and free of non-bonded portions over the entire bonded surface.

EXAMPLE 3

A round rod of Al₂O₃ having a diameter of 10 mm and a length of 20 mm was provided and ion-plated on the outer surface thereof with Cu₂O+Cu (40% Cu₂O, 60% Cu on the weight basis) in a thickness of 25 μm, followed by thermal reaction treatment using the HIP treatment in an atmosphere of Ar under conditions of a temperature of 1000° C., an Ar gas pressure of 15 kg/mm² and a treating time of 30 minutes.

Subsequently, an SS 41 hollow cylinder used as a metal being bonded and having an inner diameter of 10.25 mm, an outer diameter of 16.25 mm and a length of 20 mm was provided, into which the Al₂O₃ round rod applied with an Ag brazing paste was inserted, followed by brazing at a temperature of 850° C. in an atmosphere of Ar for a time of 5 minutes.

As a result, there was obtained a good joint involving no cracks in the Al₂O₃ and free of any non-bonded portions over the entire bonded surface of the cylinder.

EXAMPLE 4

Al₂O₃ in the form of a 3 mm thick sheet was provided, on which Cu₂O+Cu (50% Cu₂O, 50% Cu on the weight basis) were ion-plated in a thickness of 30 μm, followed by the HIP treatment in an atmosphere of Ar under conditions of a temperature of 1000° C., an Ar pressure of 15 kg/mm² and a treating time of 30 minutes.

Subsequently, a 5 mm thick SUS 304 sheet which had been previously diffusion-welded with Kovar in a thickness of 3 mm was put in face-to-face relation with the Cu₂O+Cu surface and an Ag brazing material was placed between the Cu₂O+Cu surface and the Kovar, followed by brazing in an atmosphere of Ar under brazing conditions of a temperature of 850° C. and a time of 5 minutes.

As a result, there was obtained a good joint involving no cracks in the Al₂O₃ sheet and free of non-bonded portions over the entire surface of the joint.

EXAMPLE 5

Cu₂O+Al (50% Cu₂O, 50% Al on the weight basis) were ion-plated on ZrO₂ provided as a 3 mm thick sheet, followed by thermal reaction treatment using the HIP treatment in an atmosphere of Ar under conditions of a temperature of 600° C., an Ar gas pressure of 5 kg/mm² and a treating time of 30 minutes.

Thereafter, a 5 mm thick Al plate used as a metal being bonded was placed in face-to-face relation with the Cu₂+Al surface, between which was provided an Al—Si brazing material, following by brazing in vacuo at a temperature of 600° C. for a time of 5 minutes.

As a result, there was obtained a good joint involving no cracks in the ZrO₂ and free of non-bonded portions over the entire joint surface.

EXAMPLE 6

Al₂O₃ was provided as a 2 mm thick sheet and ion-plated with Al₂O₃+Ni (30% Al₂O₃, 70% Ni on the weight basis) in a thickness of 10 μm, followed by thermal reaction treatment in vacuo under conditions of a temperature of 1200° C. and a time of 1 hour.

Subsequently, a 5 mm thick SS 41 plate used as a metal being bonded was facing with the Al₂O₃+O₃+Ni surface, followed by diffusion welding in vacuo under conditions of a temperature of 900° C., a pressure of 1 kg/mm² and a time of 1 hour.

As a result, there was obtained a good joint involving no cracks in the Al₂O₃ and free of non-bonded portions over the entire surface.

What is claimed is:

1. A method for bonding oxide ceramics and metals which comprises the steps of depositing, on an oxide ceramic material, a composite insert material consisting of a mixture of at least one oxide selected from the group consisting of Cu₂O, NiO, SiO₂, FeO, AgO, Al₂O₃, MoO, TiO₂, ZnO, AuO, Cr₂O₃, CoO, ZrO₂, TaO, WO₂, NbO, MgO, CaO and Y₂O₃, and at least one metal selected from the group consisting of Cu, Ni, Si, Fe, Ag, Al, Mo, Ti, Zn, Au, Cr, Co, Zr, Ta, W, Nb and Mg by ion plating, bonding said composite insert material and said ceramic metallurgically by heating said composite insert material in an inert gas atmosphere or under vacuum at temperatures more than one-third of the melting point of said composite insert material and less than said melting point of said composite insert material, and subsequently diffusion-welding said ceramic and said composite insert material by heating while pressurizing the surface of said composite insert material and said bonding metal at less than 5 kg/mm² in an atmosphere of inert gas or under vacuum.

2. A method for bonding oxide ceramics and metals which comprises the steps of depositing, on an oxide ceramic material, a composite insert material consisting of a mixture of at least one oxide selected from the group consisting of Cu₂O, NiO, SiO₂, FeO, AgO, Al₂O₃, MoO, TiO₂, ZnO, AuO, Cr₂O₃, CoO, ZrO₂, TaO, WO₂, NbO, MgO, CaO and Y₂O₃, and at least one metal selected from the group consisting of Cu, Ni, Si, Fe, Ag, Al, Mo, Ti, Zn, Au, Cr, Co, Zr, Ta, W, Nb and Mg by ion plating, then bonding said composite insert material and said ceramic metallurgically by heating said composite insert material in an inert gas atmosphere or under vacuum at temperatures more than one-third of the melting point of said composite insert material and less than said melting point of said composite insert material, and subsequently brazing the surface of said composite insert material and said bonding metal.

3. A method for bonding oxide ceramics and metals which comprises the steps of depositing, on an oxide ceramic material, a composite insert material consisting of a mixture of at least one oxide selected from the group consisting of Cu₂O, NiO, SiO₂, FeO, AgO, Al- $_2O_3$, MoO, TiO$_2$, ZnO, AuO, Cr$_2$O$_3$, CoO, ZrO$_2$, TaO, WO$_2$, NbO, MgO, CaO and Y$_2$O$_3$, and at least one metal selected from the group consisting of Cu, Ni, Si, Fe, Ag, Al, Mo, Ti, Zn, Au, Cr, Co, Zr, Ta, W, Nb and Mg by spray coating, bonding said composite insert material and said ceramic metallurgically by heating said composite insert material in an inert gas atmosphere or under vacuum at temperatures more than one-third of the melting point of said composite insert material and less than said melting point of said composite insert material, and subsequently diffusion-welding said ceramic and said composite insert material by heating while pressurizing the surface of said composite insert material and said bonding metal at less than 5 kg/mm$^2$ in an atmosphere of inert gas or under vacuum.

4. A method for bonding oxide ceramics and metals which comprises the steps of depositing, on an oxide ceramic material, a composite insert material consisting of a mixture of at least one oxide selected from the group consisting of Cu$_2$O, NiO, SiO$_2$, FeO, AgO, Al$_2$O$_3$, MoO, TiO$_2$, ZnO, AuO, Cr$_2$O$_3$, CoO, ZrO$_2$, TaO, WO$_2$, NbO, MgO, CaO and Y$_2$O$_3$, and at least one metal selected from the group consisting of Cu, Ni, Si, Fe, Ag, Al, Mo, Ti, Zn, Au, Cr, Co, Zr, Ta, W, Nb and Mb by spray coating, then bonding said composite insert material and said ceramic metallurgically by heating said composite insert material in an inert gas atmosphere or under vacuum at temperatures more than one-third of the melting point of said composite insert material and less than said melting point of said composite insert material, and subsequently brazing the surface of said composite insert material and said bonding metal.

* * * * *